United States Patent
Igarashi (10) Patent No.: US 8,174,729 B2
(45) Date of Patent: May 8, 2012

(54) PRINTING APPARATUS, PRINTING SYSTEM, AND PRINTING METHOD

(75) Inventor: Hiroya Igarashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 368 days.

(21) Appl. No.: 12/539,345

(22) Filed: Aug. 11, 2009

(65) Prior Publication Data

US 2010/0053708 A1 Mar. 4, 2010

(30) Foreign Application Priority Data

Aug. 28, 2008 (JP) ................................. 2008-219750

(51) Int. Cl.
*G03F 3/08* (2006.01)
(52) U.S. Cl. ......... 358/1.9; 358/518; 358/519; 382/162; 382/167
(58) Field of Classification Search .................. 358/1.9, 358/1.15, 504, 406, 518, 519, 448; 382/162, 382/167; 399/49
See application file for complete search history.

(56) References Cited

U.S. PATENT DOCUMENTS

| | | | | |
|---|---|---|---|---|
| 6,094,502 | A * | 7/2000 | Hirata et al. .................. | 382/167 |
| 6,280,105 | B1 * | 8/2001 | Iida ................. | 400/74 |
| 6,795,216 | B1 * | 9/2004 | Yamada et al. ............... | 358/468 |
| 6,825,944 | B1 * | 11/2004 | Noda ............................ | 358/1.15 |
| 7,995,240 | B2 * | 8/2011 | Ikeno et al. .................... | 358/1.9 |
| 2007/0019258 | A1 * | 1/2007 | Hattori .......................... | 358/518 |
| 2007/0247680 | A1 * | 10/2007 | Nakane et al. ................ | 358/521 |
| 2008/0130038 | A1 | 6/2008 | Igarashi | |
| 2008/0285990 | A1 * | 11/2008 | Nishizawa ...................... | 399/49 |

FOREIGN PATENT DOCUMENTS

| | | |
|---|---|---|
| JP | 2001-18498 | 1/2001 |
| JP | 2005-014555 | 1/2005 |
| JP | 2007-178489 A | 7/2007 |

OTHER PUBLICATIONS

Feb. 18, 2011 Japanese Office Action and English-language translation thereof in Japanese Application No. 2008-219750.
Japanese Office Action dated Feb. 18, 2011, in Japanese Application No. 2008-219750.

* cited by examiner

*Primary Examiner* — Kimberly A Williams
(74) *Attorney, Agent, or Firm* — Fitzpatrick, Cella, Harper & Scinto (57) ABSTRACT

A printing apparatus having a print unit and a print controller with a first density correcting component performing a density correction to image data transmitted to the unit is provided. The correction accords with a printing capacity of the unit. The apparatus comprises a component notifying a separate apparatus of an order to make a second density correcting component perform a density correction an amount of which is the same as that of the density correction by the first correcting component. The separate apparatus is provided with a transmitter and the second correcting component, the transmitter being capable of transmitting image data to the unit bypassing the first correcting component provided in the controller, and the second correcting component being capable of performing a density correction to the image data. The correction accords with the printing capacity of the unit.

2 Claims, 8 Drawing Sheets

PRINTING APPARATUS, PRINTING SYSTEM, AND PRINTING METHOD

BACKGROUND OF THE INVENTION

1. Field of the Invention

The present invention relates to a printing system, a printing apparatus, and a printing method that create and control image data digitally to form an image on a paper. More specifically, the present invention relates to a printing system, a printing apparatus, and a printing method that output image data after subjecting it to gamma correction processing.

2. Description of the Related Art

Calibrations in a printing apparatus, such as a printer, are normally performed in the form of updating of processing parameters in color conversion processing, such as output gamma correction processing. More specifically, the above-mentioned processing is performed generally using a gamma correction table (also called a lookup table "LUT") and calibrations are performed by updating the table data. Then, in order to update the table data, a series of processing steps to perform calibrations, such as a step of outputting a predetermined image (for example, patch) by a printing apparatus, a target of the calibrations, and a step of reading the image optically, is required (for example, Japanese Patent Laid-Open No. 2001-018498).

A printing apparatus that performs calibrations independently is also known. In particular, in a printing apparatus that adopts an electronic photographing system, calibrations can be performed comparatively easily. Specifically, it is not necessary to output a patch on a printing paper but, for example, a toner image of a predetermined number of patches is formed on a transfer drum and then the toner image is read by an optical sensor provided in advance, and based on the read result, calibration data is created.

Calibrations in such a printing apparatus are performed automatically when, for example, parts, such as a photosensitive drum, are replaced with others, or when environmental parameters such as temperature and humidity change by a predetermined amount or more. It is also possible for a user to perform calibrations at an arbitrary timing.

However, when a gamma correction table is updated by calibrations, pages having already been subjected to gamma correction processing before the calibrations are printed as they are. In this case, those printed pages have not been subjected to appropriate gamma correction processing at that point of time, and therefore, there arises a problem that the printed matter has poor images.

SUMMARY OF THE INVENTION

The present invention provides a printing apparatus provided with a print unit and a print controller having a first density correcting component configured to perform a density correction to image data which is transmitted to the print unit. The correction accords with a printing capacity of the print unit. The apparatus comprises a component configured to notify a separate apparatus of an order to make a second density correcting component perform a density correction an amount of which is the same as that of the density correction by the first density correcting component, wherein the separate apparatus is provided with a transmission unit and the second density correcting component, the transmission unit being capable of transmitting image data to the print unit bypassing the first density correcting component provided in the print controller, and the second density correcting component being capable of performing a density correction to the image data, wherein the correction accords with the printing capacity of the print unit. According to the present invention, it is possible to obtain output material having been subjected to appropriate gamma correction even if a gamma correction table is updated by the correction capability of a printing apparatus.

Further features of the present invention will become apparent from the following description of exemplary embodiments (with reference to the attached drawings).

DESCRIPTION OF THE EMBODIMENTS (First Embodiment)
[Explanation of System Outline]

Figure 1:
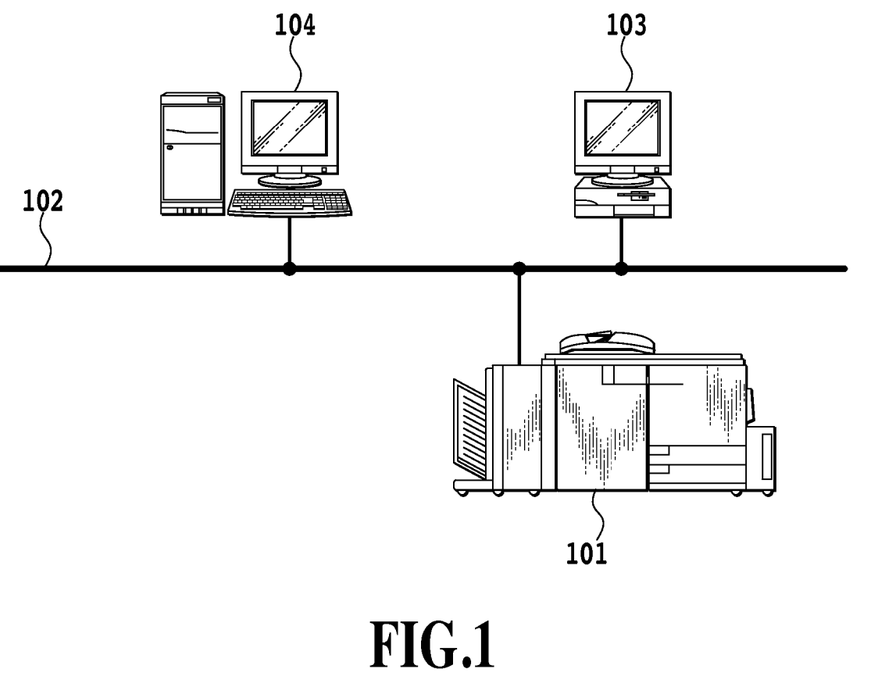
FIG. 1 is a block diagram showing a system configuration of an embodiment of the present invention.

FIG. 1 is a block diagram showing a configuration of an image processing system according to the present invention. The present image processing system, that is, an image printing system, includes an image forming apparatus (printing apparatus) 101, a print server 104, and a computer terminal 103 connected to a network 102.

[Configuration of an Image Forming Apparatus]

Figure 2:
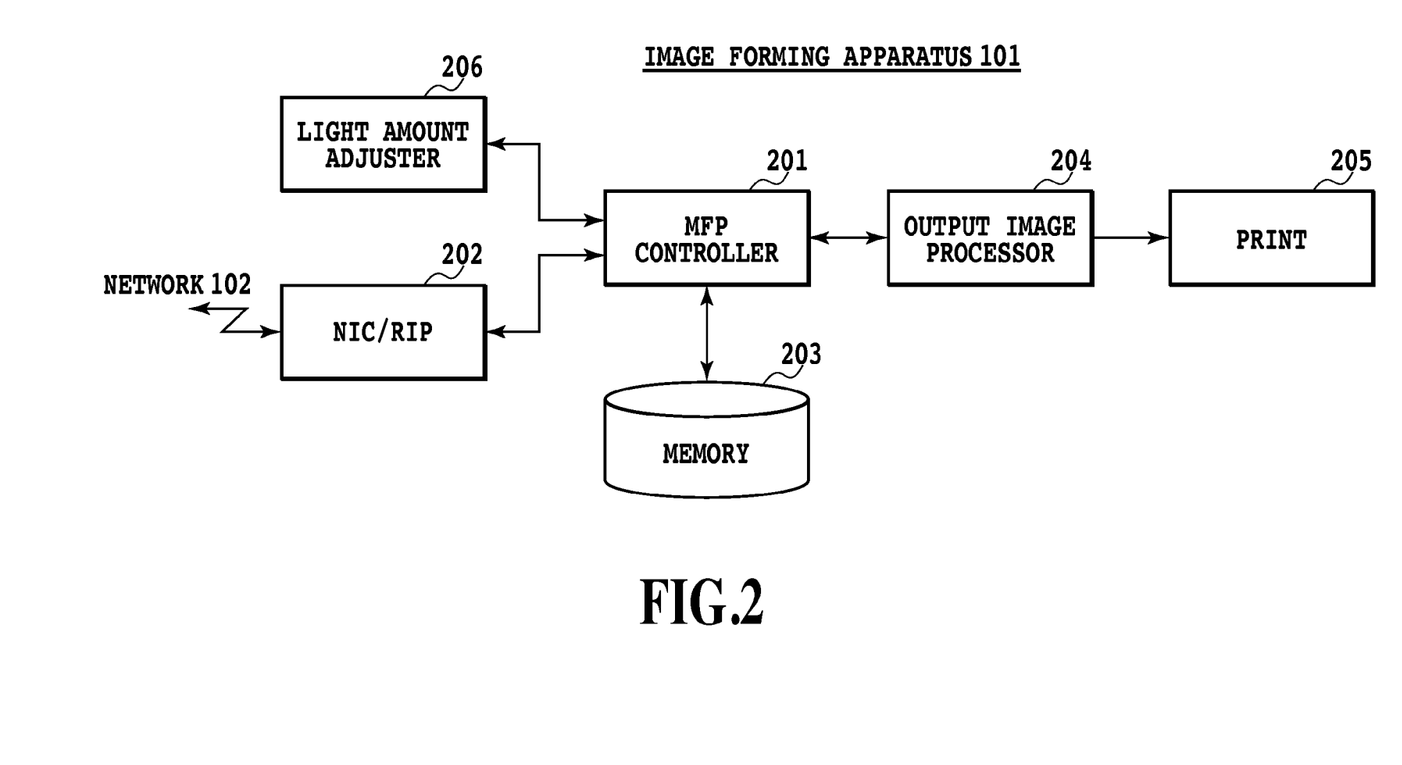
FIG. 2 is a block diagram showing a configuration of a multi function printer (MFP) in FIG. 1.

Using FIG. 2, a configuration of a printing apparatus according to the present invention, that is, an image forming apparatus (MFP: Multi Function Printer) will be described.

When image data is input to the multi function printer 101 in FIG. 1 from the print server 104 or the computer terminal 103 via the network 102, an NIC unit/RIP unit 202 in FIG. 2 operates as follows. That is, the NIC unit/RIP unit 202 receives the input image data (mainly, PDL data), interprets the received image data, and performs the RIP (Raster Image Processor) development.

Next, the developed image data is sent to an MFP controller 201. The MFP controller 201 controls data to be input and data to be output, that is, it plays a role in controlling traffic of data.

The image data sent to the MFP controller 201 is temporarily stored in a memory 203 in a state of not having been subjected to image processing (including gamma correction) in an output image processor 204. The stored multi-valued image data is temporarily stored or called up when the need arises and sent to the output image processor 204.

The output image processor 204 sends the multi-valued image data that has been sent to a print unit 205 after subjecting it to image processing for printing.

The print unit 205 feeds paper and prints the N-valued image data sent from the output image processor 204 on the fed paper in order.

A light amount adjuster 206 adjusts an amount of laser exposure (to be described later) when printing in the print unit 205. A gamma correction table is used in an output gamma correction unit 301 (to be described later) of the output image processor 204. The light amount adjuster 206 notifies the output image processor 204 of the updated gamma correction table via the MFP controller 201 when the gamma correction table is updated.

[Configuration of Output Image Processor]

Using FIG. 3, the output image processor 204 included in the multi function printer 101 will be described.

The output gamma correction unit 301 performs density correction processing (gamma correction) of the N-valued image data obtained by the development in the RIP unit 202. The gamma correction plays a role in maintaining linearity between an input image and an output image in accordance with the state of the multi function printer by making use of the gamma correction table, which is a one-dimensional lookup table of CMYK, respectively. The result of calibrations in the light amount adjuster 206 (to be described later) is reflected in the gamma correction table. The image data after having been subjected to the gamma correction is sent to a halftone processor 302 and subjected to halftone processing. The halftone processor 302 can apply different kinds of screening alternatively in accordance with the MFP capability. In general, in a copying operation etc., an error-diffusion screening 320 in which a moire is unlikely to occur is made use of frequently and in a printing operation, a multi-valued screen type screening 321 that makes use of a dither matrix is used frequently in view of the reproducibility of characters and thin lines. The error-diffusion screening is a method in which weighting is done with an error filter for a target pixel and its peripheral pixels and the multi-valued errors are distributed and corrected while maintaining the number of gradations. On the other hand, the multi-valued screen type screening is a method in which the threshold value of the dither matrix is set to multiple values and an intermediate gradation is expressed in a pseudo manner and CMYK are converted independently.

Further, a smoothing processor 303 performs processing to reduce jaggies by detecting edge portions of the data of each of CMYK by pattern matching and converting it into a pattern that can be reproduced more smoothly.

[Light Amount Adjuster]

Figure 4:
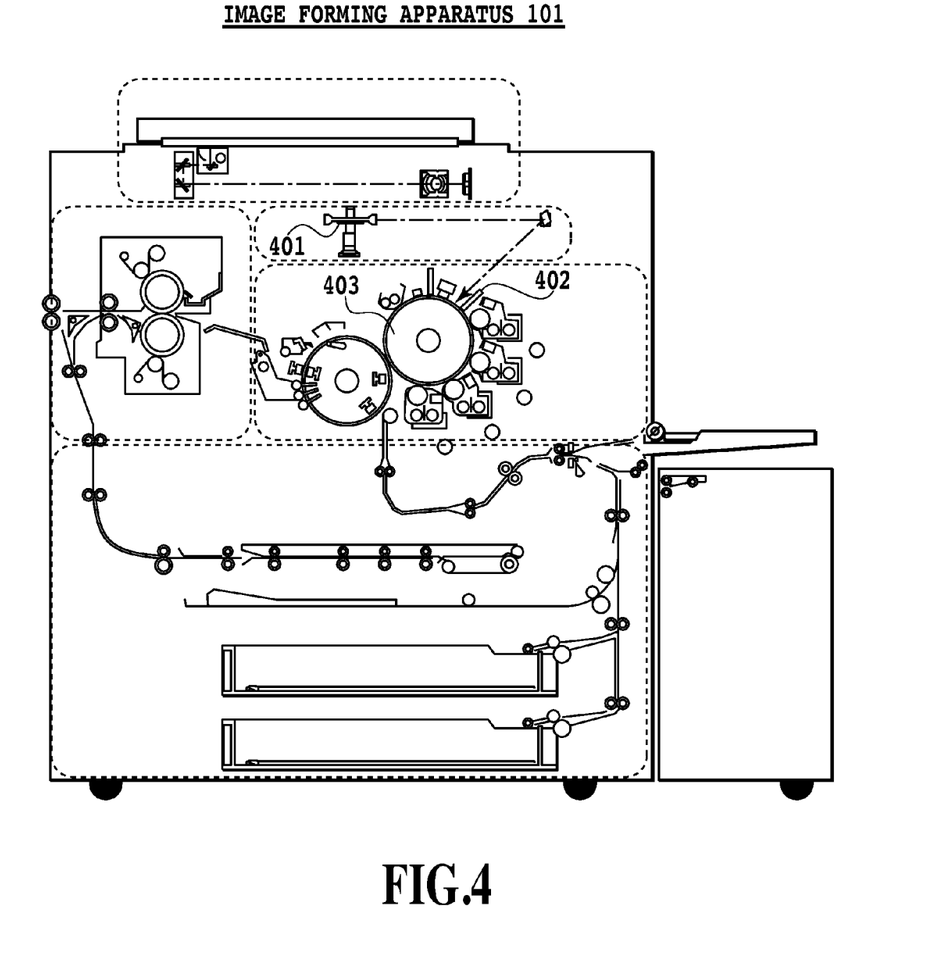
FIG. 4 is a section view of the MFP in FIG. 1.

Using FIG. 4, calibrations in the light amount adjuster 206 included in the multi function printer 101 will be described.

In the multi function printer 101, the density characteristics of an output image vary in accordance with the state at that time when, for example, consumables, such as toner, or a photoconductive drum 403 is replaced with another, the temperature and humidity in the apparatus rise a predetermined amount or more, a predetermined number of pieces of paper are printed, etc. In order to print in accordance with the density characteristics (output characteristics), the light amount adjuster 206 performs the following calibrations when notified to perform calibrations by the MFP controller 201 at the timing when the density characteristics change.

Calibrations consist of maximum density control of each color and halftone gradation control.

The maximum density control is performed for the purpose of keeping the maximum density of each color constant and preventing poor fixation due to too much toner applied. In the maximum density control, first, a maximum density detection pattern by toner is formed on the photoconductive drum 403. Next, by reading the detection pattern with an optical sensor 402, the condition under which a desired maximum density can be obtained is calculated. Then, in accordance with the calculation result, the maximum density in accordance with the state of the multi function printer 101 is adjusted by adjusting the amount of exposure of a semiconductor laser 401.

The halftone gradation control is performed for the purpose of updating a gamma correction table to be used in the output gamma correction unit 301. In the halftone gradation control, first, a density detection pattern by toner of a plurality of gradation values is formed on the photoconductive drum 403 for the image data. Next, the maximum density detection pattern is read by the optical sensor 402 and the condition under which a desired maximum density can be obtained is calculated using the detected density and thus the gamma correction table is updated.

Only with the maximum density control, it is not possible to deal with the change of the input/output characteristics (gamma characteristics) caused by the deterioration of each unit due to the use of the multi function printer 101. Similarly, only with the halftone gradation control, it is not possible to print at a maximum density due to the deterioration of each unit of the multi function printer 101 even by performing gamma correction on the image data in order to produce an output at a maximum density. Because of this, it is necessary to perform both the maximum density control and the halftone gradation control. In general, after the maximum density control is performed, the halftone gradation control is performed.

Figure 5:
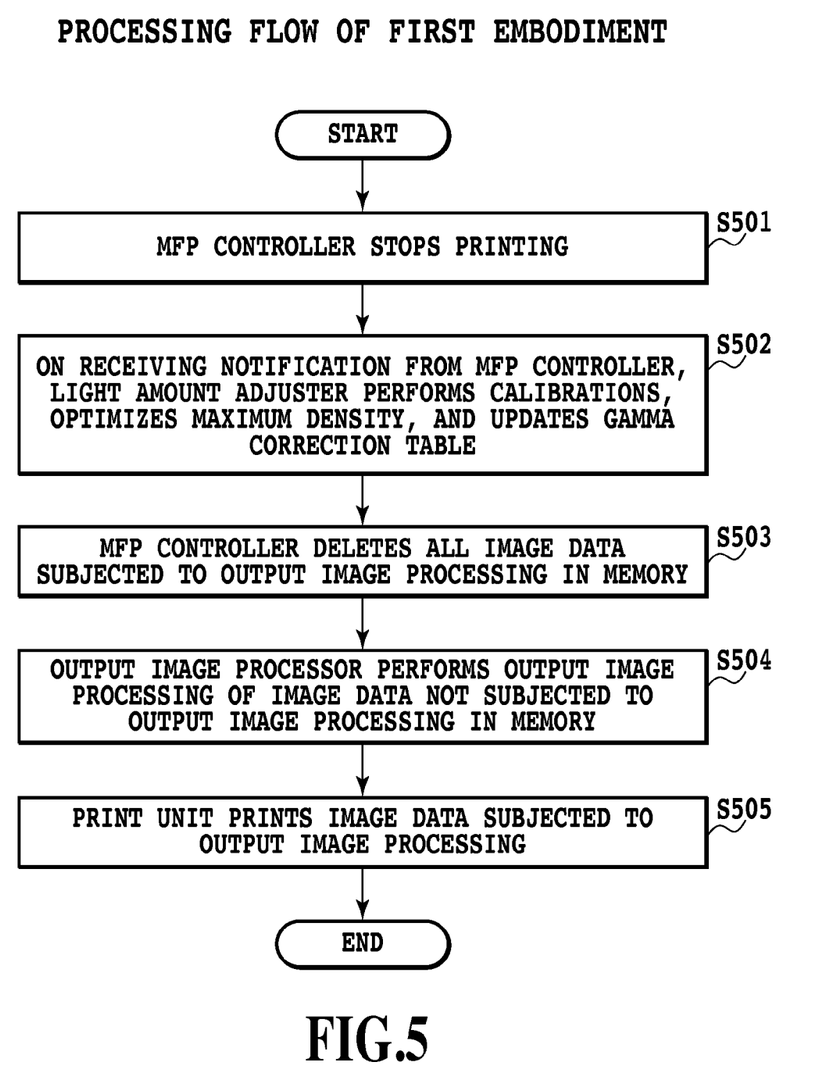
FIG. 5 is a flowchart in a first embodiment.

FIG. 5 is a flowchart in the first embodiment, in which a gamma correction is performed by the multi function printer 101.

The multi function printer 101 stores image data in the stage before image processing is performed in the output image processor 204 in the memory 203 until printing of the input image data is completed in preparation for the updating of the gamma correction table. In more detail, the multi function printer 101 stores image data in the stage before the gamma correction is performed in the output gamma correction unit 301 before the flow starts in the memory 203.

The MFP controller 201 performs step S501 at various timings when the above-described density characteristics of the output image change and stops printing in order to perform calibrations. Each processing in the flowchart is performed each time calibrations are performed.

The MFP controller 201 notifies the light amount adjuster 206 to perform calibrations in step S502. When receiving the notification from the MFP controller 201, the light amount adjuster 206 performs calibrations and performs the optimization of the maximum density and the updating of the gamma correction table.

In step S503, the MFP controller 201 discards the image data in the standby for printing having been subjected to image processing, such as a gamma correction, in the output image unit 204 and stored in the memory 203.

Instep S504, the MFP controller 201 reads image data before the gamma correction in a state of not having been subjected to image processing in the output image processor 204, which is stored in the memory 203, from an aborted page, and sends it to the output image processor 204. The output image processor 204 performs image processing of the image data before the gamma correction sent from the MFP controller 201. At the time of the image processing, the output gamma correction unit 301 of the output image processor 204 performs gamma correction using the new gamma correction data updated in step S502. The image data having been subjected to each processing in the output image processor 204 is sent to the print unit 205 and stored in the memory 203 via the MFP controller 201.

In step S505, the print unit 205 prints an image on a paper using the image data sent from the output image processor 204 in step S504.

As described above, in the present embodiment, during the printing processing of image data, if the gamma correction table is updated before output, an output is produced without using the image data having been processed with the gamma correction table before the updating. That is, in place of the image data, image data before the gamma correction stored in the memory, which is subjected to the gamma correction with the updated gamma correction table and then to halftone processing etc., and is used to produce an output in the print unit. Because of this, according to the present embodiment, it is possible to print in accordance with the multi function printer in the state where the light amount adjustment is made by calibrations.

In addition, in order to suppress variations in color tone during one job, it may also be possible to output the job as it is during printing at the time when calibrations are performed and perform gamma correction using a new gamma correction table from the next job. Further, it may also be possible to perform the calibrations themselves between jobs.

(Second Embodiment)

Figure 6:
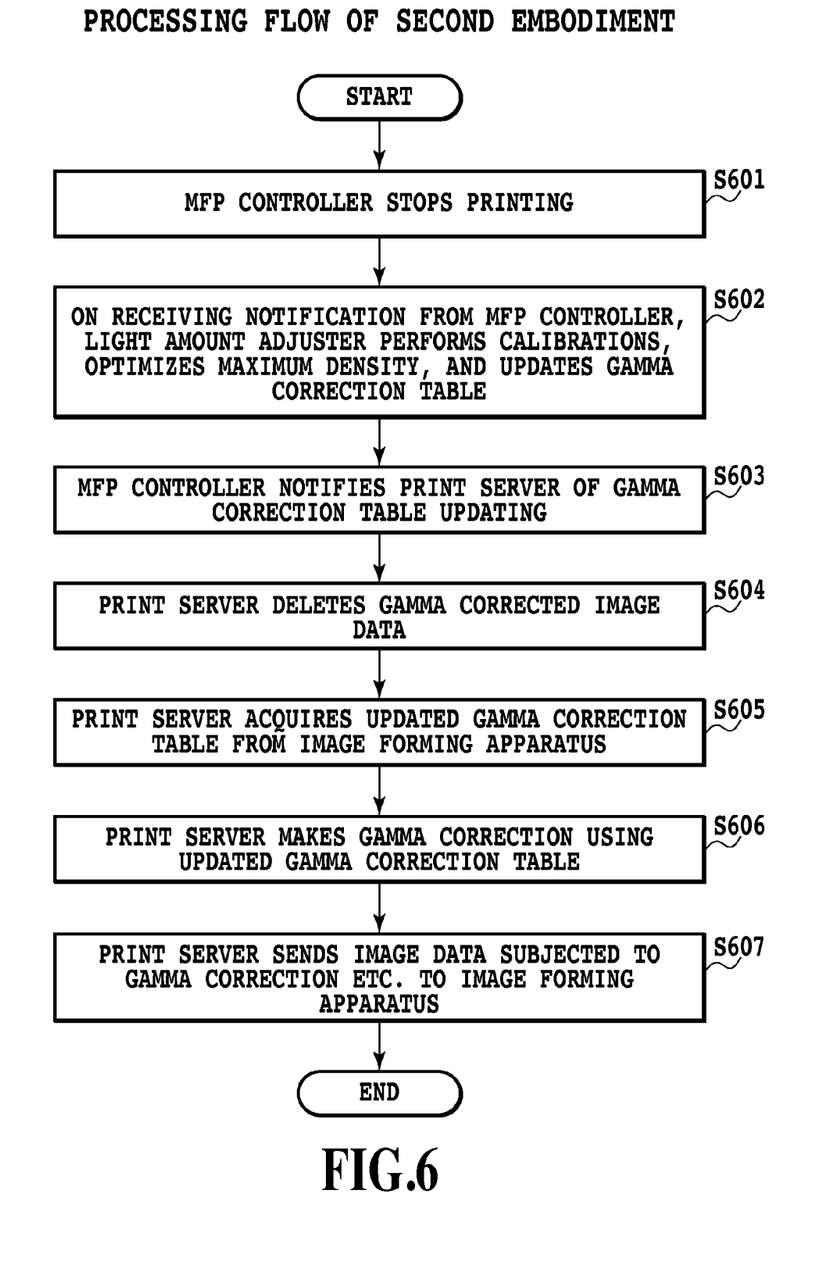
FIG. 6 is a flowchart in a second embodiment.

FIG. 6 is a flowchart in a second embodiment, in which the gamma correction is performed using the print server 104. The advantage of using the print server 104 is that output image processing, such as the RIP processing and gamma correction, can be performed at a higher speed than the multi function printer and that the output of printed matter of the multi function printer can be produced quickly. Further, it is also possible for a user to confirm the output image processing result on the display of the print server 104.

In the form of an output that is not via or bypasses a print server, such as when the multi function printer 101 copies or when the computer terminal 103 directly instructs the multi function printer 101 to print, it is necessary to perform output image processing in the multi function printer 101.

Figure 3:
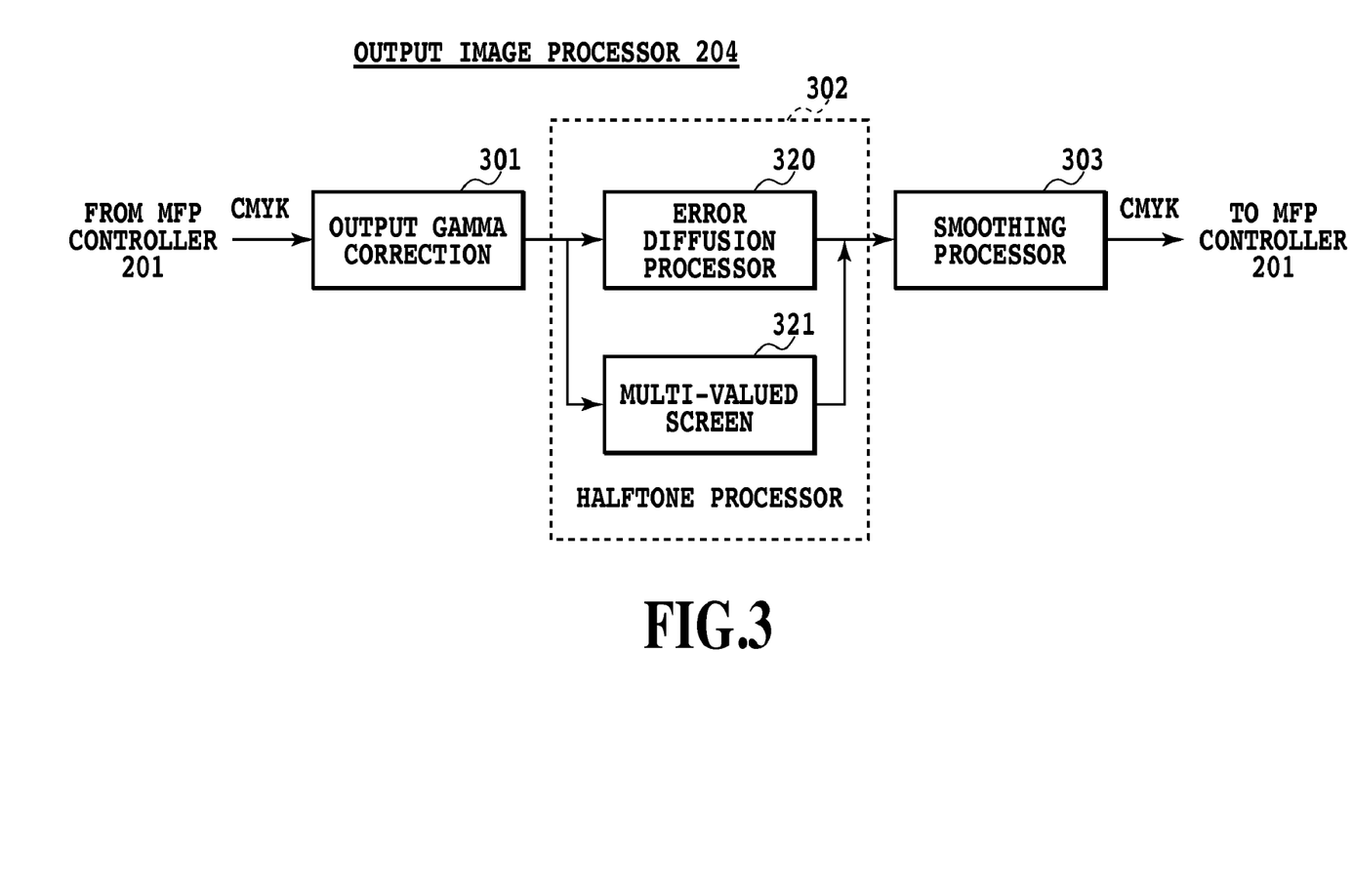
FIG. 3 is a block diagram showing a configuration of an output image processor in FIG. 2.

Because of this, in the present embodiment, the print server 104 is made to have the same capability as that of the output image processor 204 shown in FIG. 3.

In the printing via the print server 104 according to the present embodiment, the processing in the output image processor 204 shown in FIG. 3 is not performed in the multi function printer 101. However, the configuration of the multi function printer 101 may be the same as that of the multi function printer 101 in the first embodiment shown in FIG. 2.

Figure 7:
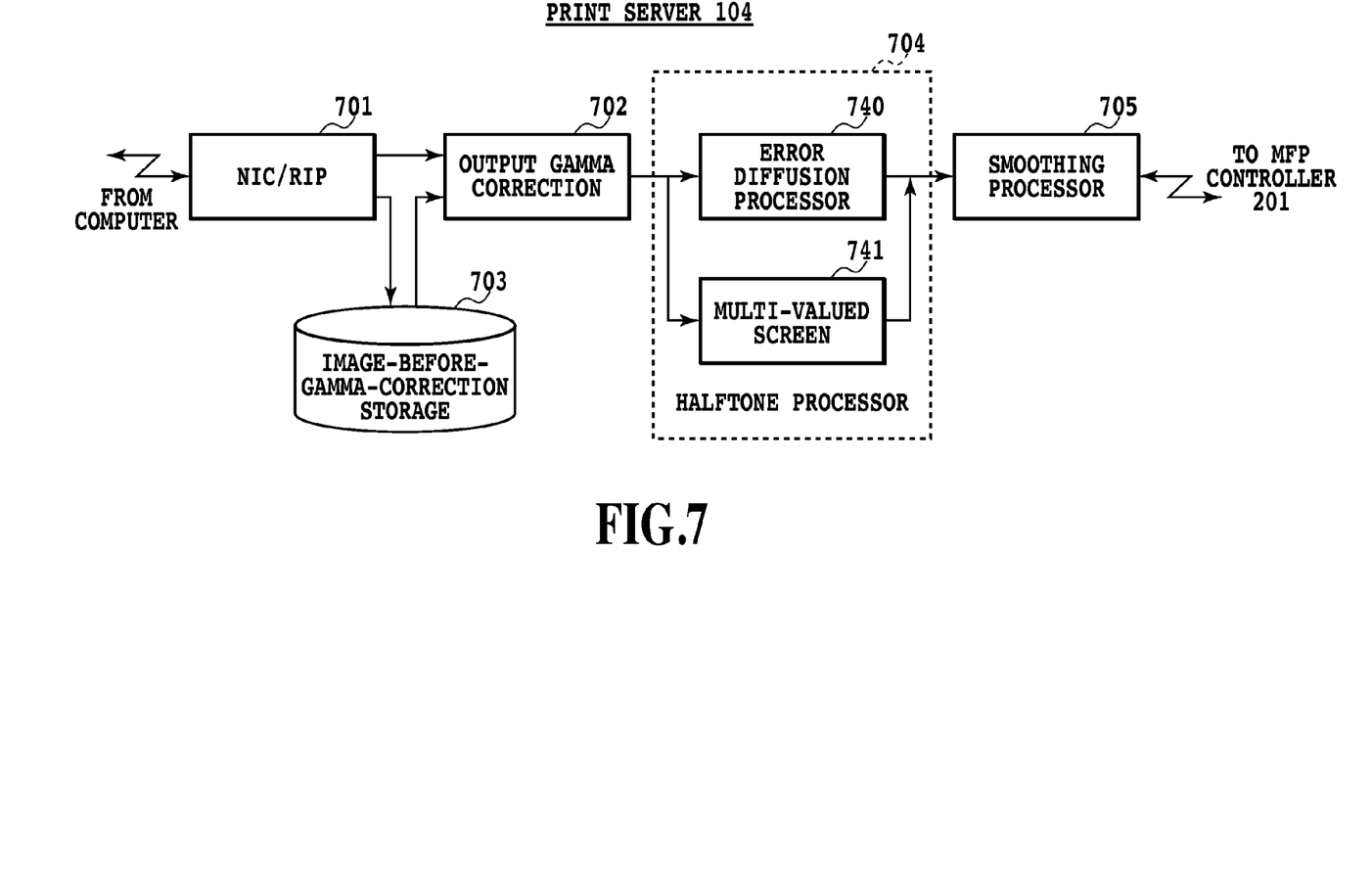
FIG. 7 is a block diagram showing a configuration of a print server in the second embodiment and in a third embodiment.

FIG. 7 is a block diagram of the print server 104 used in the second embodiment.

The print server 104 receives a print job sent from the computer terminal 103 at an NIC unit/RIP unit 701 and performs the RIP processing. The image data having been subjected to the RIP processing is further subjected to gamma correction in an output gamma correction unit 702. The image before the gamma correction is stored in an image-before-gamma-correction storage 703. The print server 104 deletes the stored image data when the printing is completed. The image having been subjected to the output gamma correction in the output gamma correction unit 702 is further subjected to halftone processing in a halftone processor 704. The image having been subjected to the halftone processing is further subjected to smoothing processing in a smoothing processor 705 and then sent to the MFP controller 201 of the multi function printer 101 through the network 102.

In the flowchart in FIG. 6, the MFP controller 201 performs step S601 at various timings when the density characteristics of an output image vary and stops printing to perform calibrations. Each processing in the flowchart is performed each time calibrations are performed.

In step S602, the MFP controller 201 notifies the light amount adjuster 206 to perform calibrations. The light amount adjuster 206 receives the notification from the MFP controller 201 and performs calibrations, and executes the optimization of the maximum density and the updating of the gamma correction table.

In step S603, the MFP controller 201 notifies the print server 104 of the updating of the gamma correction table via the NIC unit 202. Here, in order for the print server 104 to be capable of acquiring the gamma correction table at an arbitrary timing, only the update notification that the gamma correction table has been updated is made.

In step S604, in response to the update notification, the print server 104 deletes the image data having been subjected to the gamma correction using the gamma correction table before the updating and already input to the multi function printer 101, and the image data having been subjected to halftone processing.

In step S605, the print server 104 acquires the updated gamma correction table from the multi function printer 101. In more detail, the print server 104 makes an acquisition request to the MFP controller 201 via the NIC unit 202 for the gamma correction table and the MFP controller 201 that has received the request transmits the gamma correction table to the print server 104 via the NIC unit 202.

In step S606, the output gamma correction unit 702 of the print server 104 performs gamma correction processing from the aborted page using the image data stored in the image-before-gamma-correction storage 703 and the updated gamma correction table acquired from the multi function printer in step S605.

In step S607, the print server 104 transmits the image data to the multi function printer 101, which image data having been subjected to the halftone processing and smoothing processing in the halftone processor 704 and the smoothing processor 705 in addition to the gamma correction processing.

As described above, in the present embodiment, a apparatus other than the multi function printer, that is, the print server 104 performs processing, such as gamma correction. When the multi function printer 101 performs calibrations, it is possible for the print server 104 to acquire the updated gamma correction table, perform the gamma correction processing of the image data in accordance with the light amount adjustment of the multi function printer 101, and send the image data to the multi function printer 101.

In order to suppress the variations in color tone during one print job, it may also be possible for the print server 104 to perform gamma correction processing using the old gamma correction table when calibrations occur and perform gamma correction processing using a new gamma correction table from the next print job. Alternatively, it may also be possible for the multi function printer 101 to perform the calibrations themselves between jobs.

(Third Embodiment)

Figure 8:
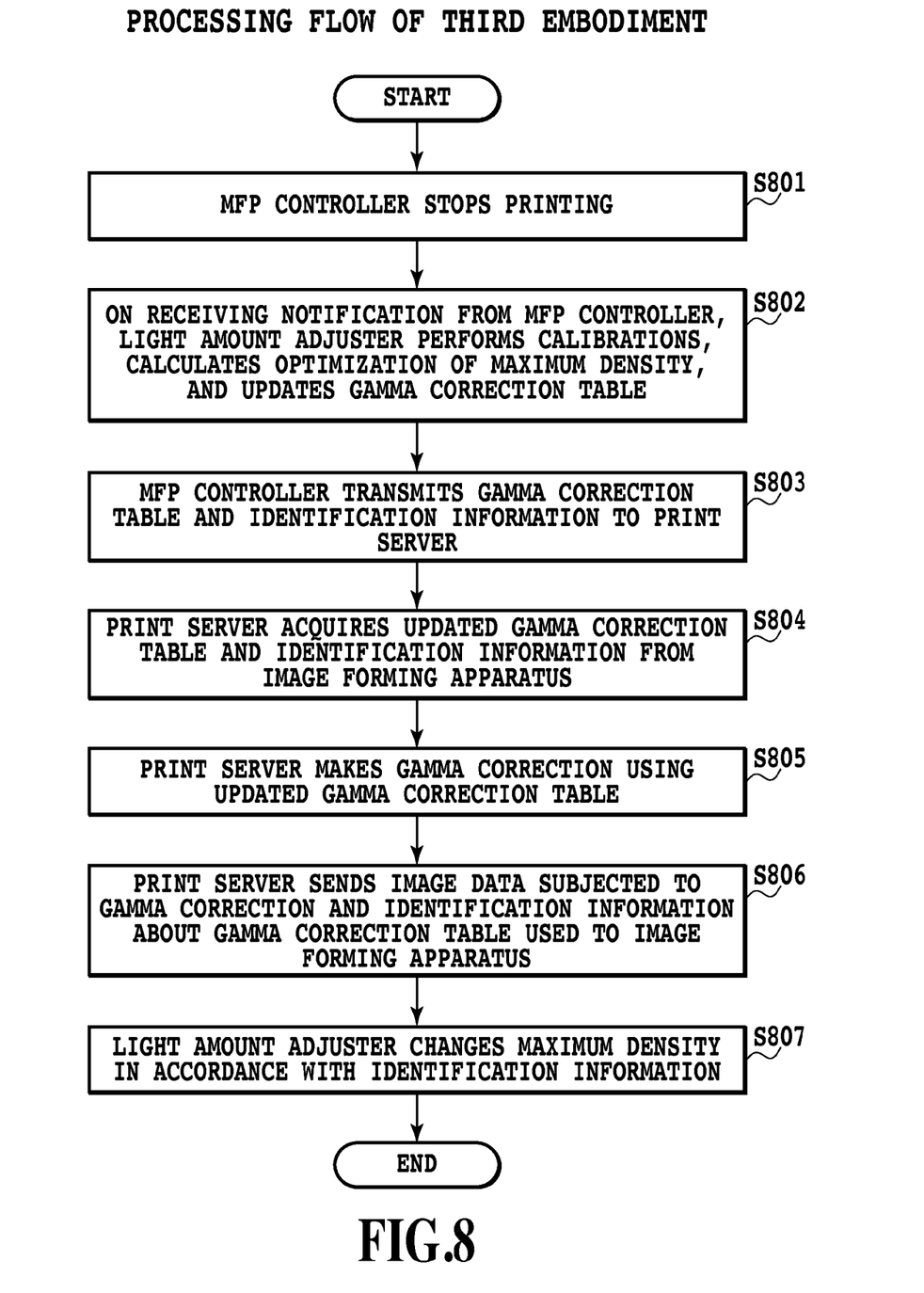
FIG. 8 is a flowchart in the third embodiment.

FIG. 8 is a flowchart in a third embodiment that uses a print server.

In the present embodiment, as in the second embodiment, the print server 104 is made to have the same capability as that of the output image processor 204 shown in FIG. 3. The block configuration of the print server 104 is the same as that in the second embodiment shown in FIG. 7.

The MFP controller 201 performs step S801 at various timings when the density characteristics of an output image vary and stops printing to perform calibrations. Each processing in the flowchart is performed each time calibrations are performed.

In step S802, the MFP controller 201 notifies the light amount adjuster 206 to perform calibrations. The light amount adjuster 206 receives the notification from the MFP controller 201 and performs calibrations, calculates an optimum value of the maximum density, and stores the optimum value along with the index in the memory 203. Further, the light amount adjuster 206 updates the gamma correction table and gives to the updated gamma correction table the index for the correspondence between the stored maximum density and the updated gamma correction table.

In step S803, the MFP controller 201 notifies the print server 104 of the updating of the gamma correction table via the NIC unit 202. Here, in order for the print server 104 to be capable of acquiring the gamma correction table at an arbitrary timing, only the update notification that the gamma correction table has been updated is made.

In step S804, the print server 104 acquires the updated gamma correction table and identification information (index) for uniquely identifying the updated gamma correction table from the multi function printer 101. In more detail, the print server 104 makes an acquisition request to the MFP controller 201 via the NIC unit 202 for the gamma correction table and the MFP controller 201 that has received the request transmits the gamma correction table and identification information to the print server 104 via the NIC unit 202.

In step S805, the output gamma correction unit 702 performs gamma correction processing from the page halfway through a serial process of pages to be printed, at which the processing is aborted temporarily, using the image data stored in the image-before-gamma-correction storage 703 and the updated gamma correction table acquired in step S804.

In step S806, the print server 104 transmits the image data to the multi function printer 101, which image data having been subjected to the halftone processing and smoothing processing in the halftone processor 704 and the smoothing processor 705 in addition to the gamma correction processing. The print server 104 further transmits the index of the gamma correction table used for each page before the abortion and after the abortion to the multi function printer 101.

In step S807, the MFP controller 201 notifies the light amount adjuster 206 of the index of the above-described gamma correction table used. The light amount adjuster 206 makes a light amount adjustment by applying a maximum density value corresponding to the gamma correction table that is used stored in the memory 203 based on the notified index. Due to this processing, the light amount adjustment of the pages after the abortion is made based on the most recent maximum density information updated by the execution at this time of the processing in the flowchart. On the other hand, as to the pages before the abortion, the light amount adjustment is made based on the maximum density information updated by the execution of the processing in the flowchart at the time of the previous calibrations, that is, the maximum density information before the updating by the execution at this time of the processing in the flowchart. Consequently, for each page for which the execution of printing is aborted by calibrations, an image processed using the corresponding gamma correction table and the maximum density information updated at the same time, respectively, is output.

In order to suppress the variations in color tone during one print job, it may also be possible for the print server 104 to perform gamma correction processing using the old gamma correction table when calibrations occur and perform gamma correction processing using the new gamma correction table from the next print job. Further, it may also be possible for the multi function printer 101 to perform the calibrations themselves between jobs.

As described above, in the present embodiment, rather than making the light amount adjustment immediately by calibrations, the light amount adjustment is switched to that which corresponds to the gamma correction table used for image processing as to the pages having already been subjected to image processing at the time of the execution of calibrations and before printing. Due to this, it is possible to perform an appropriate gamma correction in accordance with the state of the light amount adjustment of the multi function printer at a higher speed than when performing the gamma correction processing again as in the first and second embodiments.

As described above, the multi function printer makes the light amount adjustment (density adjustment) by calibrations and switches a gamma correction table to another.

It is possible for the present invention to perform gamma correction using an appropriate gamma correction table in accordance with the state of the light amount adjustment of the multi function printer.

(Other Embodiments)

Aspects of the present invention can also be realized by a computer of a system or apparatus (or devices such as a CPU or MPU) that reads out and executes a program recorded on a memory device to perform the functions of the above-described embodiments), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-219750, filed Aug. 28, 2008 which is hereby incorporated by reference herein in its entirety.

What is claimed is:

1. A print system for printing image data comprising:
an information processing apparatus including:
a gamma correction unit configured to perform gamma correction with respect to image data by using a gamma correction table; and
a transmission unit configured to transmit gamma-corrected image data to a printer; and
a printer including:
a printing unit configured to print a print page which includes the gamma-corrected image data;
an exposure adjusting unit configured to adjust an exposure according to a maximum density calculated on the basis of density characteristics in the printing unit;
an updating unit configured to update the gamma correction table so that the gamma correction table corresponds to the maximum density;
a storage unit configured to store the updated gamma correction table associated with the maximum density;
an instruction unit configured to instruct the information processing apparatus to perform a gamma correction; and
a notification unit configured to notify the information processing apparatus of both the updated gamma correction table and an index identifying the updated gamma correction table if the gamma correction table is updated by the updating unit;

wherein if the gamma correction table is updated by the updating unit due to a change of the density characteristics in a process of printing of print pages,     the printer confirms whether an image for which gamma correction is performed by using the gamma correction table before the updating, exists in the print pages,     if the image for which gamma correction is performed by using the gamma correction table before the updating, exists in the print pages, the instruction unit instructs the information processing apparatus to perform gamma correction,     the printer deletes the image for which gamma correction is performed by using the gamma correction table before the updating, in response to the instruction, the gamma correction unit newly performs gamma correction for the image included in the print pages which have not been printed yet by using the updated gamma correction table, the transmission unit transmits image data for which gamma correction is newly performed and the index, and the exposure adjusting unit adjusts an exposure by using the maximum density associated with the updated gamma correction table which is identified by the notified index.

2. A print method in a print system to printing image data, the print system comprising an information processing apparatus and a printer,     the information processing apparatus including: a gamma correction unit configured to perform gamma correction with respect to image data by using an gamma correction table; and a transmission unit configured to transmit gamma-corrected image data to the printer; and     the printer including: a printing unit configured to print a print page which includes the gamma-corrected image data; an exposure adjusting unit configured to adjust an exposure according to a maximum density calculated on the basis of density characteristics in the printing unit; an updating unit configured to update the gamma correction table so that the gamma correction table corresponds to the maximum density; a storage unit configured to store the updated gamma correction table associated with the maximum density; an instruction unit configured to instruct the information processing apparatus to perform gamma correction: and a notification unit configured to notify the information processing apparatus of both the updated gamma correction table and an index identifying the updated gamma correction table if the gamma correction table is updated by the updating unit;

the method comprising the steps of:

if the gamma correction table is updated by the updating unit due to a change of the density characteristics in a process of printing of print pages,     the printer confirming whether an image for which gamma correction is performed by using the gamma correction table before the updating, exists in the print paces,     if the image for which gamma correction is performed by using the gamma correction table before the updating, exists in the print pages, the instruction unit instructing the information processing apparatus to perform gamma correction,     the printer deleting the image for which gamma correction is performed by using the gamma correction table before the updating, in response to the instruction, the gamma correction unit newly performing gamma correction for the image included in the print pages which have not been printed yet by using the updated gamma correction table;

the transmission unit transmitting image data for which gamma correction is newly performed and the index; and the exposure adjusting unit adjusting an exposure by using the maximum density associated with the updated gamma correction table which is identified by the notified index.

\* \* \* \* \*